(12) United States Patent
Stahl et al.

(10) Patent No.: US 6,969,007 B2
(45) Date of Patent: Nov. 29, 2005

(54) DEVICE AND METHOD FOR READING OUT INFORMATION STORED IN A STORAGE LAYER

(75) Inventors: Werner Stahl, Heimstetten (DE); Heribert Hammer, Munich (DE)

(73) Assignee: Agfa-Gevaert Aktiengesellschaft, Leverkusen (DE)

( * ) Notice: Subject to any disclaimer, the term of this patent is extended or adjusted under 35 U.S.C. 154(b) by 64 days.

(21) Appl. No.: 10/610,456

(22) Filed: Jun. 30, 2003

(65) Prior Publication Data
US 2004/0004871 A1    Jan. 8, 2004

(30) Foreign Application Priority Data
Jul. 2, 2002 (EP) .................................. 02014625

(51) Int. Cl.[7] ........................................... G06K 19/06
(52) U.S. Cl. ...................... 235/491; 235/468; 235/454; 250/587
(58) Field of Search ................ 235/491, 454, 235/468; 250/587, 584, 252, 334

(56) References Cited

U.S. PATENT DOCUMENTS 6,310,357 B1 * 10/2001 Fuchs et al. ................ 250/587
6,784,448 B2 * 8/2004 Neriishi et al. ............. 250/584

FOREIGN PATENT DOCUMENTS

EP     1 081 507 A2    3/2001
EP     02 01 4625      12/2002

* cited by examiner

*Primary Examiner*—Diane I. Lee
*Assistant Examiner*—Seung H Lee
(74) *Attorney, Agent, or Firm*—John A. Merecki; Robert A. Sabourin

(57) ABSTRACT

A device and a method for reading out information stored in a storage layer. In this connection it is possible to support the storage layer on a support surface. An emission radiation transmitted from the storage layer is received by means of a receiving device. A distance between the receiving device and the support surface can be variably adjusted.

1 Claim, 10 Drawing Sheets

DEVICE AND METHOD FOR READING OUT INFORMATION STORED IN A STORAGE LAYER

FIELD OF THE INVENTION

The present invention relates to a device and a method for reading out information stored in a storage layer.

BACKGROUND OF THE INVENTION

Such a device and method are known from EP 1 081 507 A2. This reference discloses a device in which the receiving device is supported relative to the storage layer by an air cushion that rests on the storage layer. The distance between the receiving device and the storage layer should be maintained constant within small tolerance ranges. This should be guaranteed by a uniform air pressure between the air cushion and storage layer. On account of the small air gap, which is of an order of magnitude of about 2 $\mu$m, such air cushions can be displacedly formed only with difficulty along the storage layer in order thereby to permit an optimal readout of information.

SUMMARY OF THE INVENTION

One object of the present invention is to develop a device and a method of the type mentioned in the introduction in such a way that a plurality of different storage layers can be read out efficiently and accurately.

The invention is based on the knowledge that the above object can be solved if, as reference surface to which the distance is referred, there is used not the storage layer itself but instead a reference surface other than the storage layer. The support surface on which the storage layer is supported at least during the reading out stage is advantageous for this purpose. On account of the variable adjustment of the distance between the receiving device and support surface it is possible to read out a large number of variously thick storage layers. The thickness of the respective storage layer can be considered for this purpose when adjusting the distance between the receiving device and support surface insofar as the distance is adjusted so that an in each case equal distance is adjusted between the receiving device and the various storage layers, in particular their surfaces. Due to the manufacturing processes, the storage layers may already have different thicknesses that do not fall within specified tolerance ranges.

A storage layer has almost the same thickness over its whole surface area provided that the production conditions are satisfactory. Storage layers from different batches however have different thicknesses, the differences in thickness being of such an order of magnitude that the achievable image sharpness is impaired when reading out. Furthermore the spatial position of the focal point of the receiving devices that are used varies from receiving device to receiving device. This is particularly advantageous in the case of service inserts, when the focus in the service insert has altered, for example due to replacement of the receiving device. The focal point may be determined by evaluating a test image. By means of the adjustment unit it is possible to align the focal point of the receiving device to a best possible reception and to take into account the different, optimal distances of the different receiving devices in the storage layers by means of the adjustment unit. The end result is an optimal image.

The solution according to the invention furthermore provides the advantage that the reference surface can be optimised with regard to the use of air cushions. As has in fact been found in practice, the surface of the storage layers, for example phosphorus, is of only limited suitability for supporting air cushions thereon. This is due to the roughness of such a surface having regard to the extreme smoothness required for air cushions. In order to understand this it must be borne in mind that the air gap is particularly preferably between 1 $\mu$m and 4 $\mu$m, and a wedge gap of 2 $\mu$m can already lead to semi-fluid friction, in other words could scratch the support. When using a reference surface that does not form the storage layer, this may be formed to be extremely smooth, for example of glass. In this way air cushions can be used without any problem for supporting the receiving device with respect to the reference surface, resulting in further advantages that are discussed in more detail hereinbelow.

Preferably the at least one adjustment unit is combined with a control unit which is designed so that it controls or regulates the distance with respect to a predeterminable desired value. In this way it becomes possible that for example during the course of a readout procedure, in other words when executing the relative movement between the receiving device and the storage layer, the distance between the receiving device and storage layer is controlled or finely regulated so that it is always an optimal value.

Preferably the device comprises a first and a second adjustment unit, wherein the first adjustment unit is arranged on one side of the scanning head in a direction transverse to the relative movement, and the second adjustment unit is arranged on the other side of the scanning head. On account of the fact that two adjustment units are used in this arrangement, the distance between the receiving device and storage layer may be adjusted particularly accurately.

In a preferred modification the at least one adjustment unit is mounted via in each case at least one bearing device on the reference surface. Preferably the bearing device is formed as an air cushion, which is arranged in such a way that, during operation of the device, an air gap is formed between the bearing device and the support surface. Devices according to the invention are for example used as digital X-ray scanners, which place very stringent demands on the constancy of the rate at which the storage layer is read during the readout procedure. With sliding bearings that are normally employed the uniform movement is disturbed on account of the friction effect, which cannot be completely prevented. Also, all types of roller bearings are not free of feedback.

An xy plane is defined by the support surface, wherein the relative movement for the readout takes place in the x direction and a distance in the z direction can be adjusted with the adjustment unit. Preferably the bearing device comprises at least two air cushions. The at least two air cushions form a bearing pair and are arranged in the z direction on both sides of the support surface. Due to the fact that two air cushions co-operate in the sense of a bearing and counterbearing, the receiving device can be guided reliably almost without any frictional effect along the support surface.

A particularly precise adjustment of the distance and a precise movement of the receiving device can be realised if the air gap of an air cushion is between 1 and 5 $\mu$m, in particular 2 $\mu$m.

With regard to the weight of the receiving device, it is preferred if the device comprises a first and a second adjustment unit, wherein the first adjustment unit is arranged on one side of the receiving device in a direction transverse to the relative movement of the receiving device during the readout of the storage layer, and the second adjustment unit is arranged on the other side of the receiving device. In this way the desired distance can be adjusted more quickly and accurately. In this connection it is preferred if the optimal distance for the left-hand and right-hand halves of the receiving device is determined and the in each case associated adjustment unit is correspondingly adjusted.

With regard to the very small dimensions around which the receiving device has to be adjusted relative to the storage layer in order to obtain an optimal setting that is as accurate as possible, it is preferred if the adjustment unit has a spindle with a very slight lead that is connected to a bearing device in such a way that the receiving device can be rotated about the point of connection with the bearing device. In a preferred embodiment the spindle acts on at least two connecting elements guided in parallel. Other adjustment mechanisms may however also permit a precise adjustment in the $\mu$m range.

The measures according to the invention advantageously permit a precise adjustment of the distance between the receiving device and storage layer independently of the alignment—for example horizontally or vertically—of the support surface, on which the storage layer is supported at least during the readout procedure.

The adjustment unit may for example be based on two different mechanisms. On the one hand the adjustment unit may comprise at least one distance measuring unit which is designed to measure the distance between the storage layer and the receiving device. In this connection it is preferred if the distance measuring unit comprises at least one measuring wheel for determining the distance or a device for determining the distance in a contact-free manner. Alternatively the adjustment device may comprise at least one scaling element, in particular a precision calliper. The calliper can then act on the storage layer in such a way that a distance scaling can be carried out, starting from which a desired distance can be adjusted.

The distance between the storage layer and receiving device consists of a contribution that is derived from the bearing device, for example an air cushion, and a contribution from the adjustment unit.

In the method according to the invention it may be envisaged that the distance adjustment for each storage layer is specified before the readout procedure and is maintained during the readout procedure. It may however also be envisaged to carry out a fine adjustment of the distance between the storage layer and receiving device during the readout procedure. A continuous fine adjustment leads to even better results.

It is furthermore preferred if the measured distance or the scaling result is stored in a memory associated with the storage layer. Accordingly no measurement or scaling step need be carried out beforehand in the case of a repeated readout of the same storage layer. Instead, it is sufficient to transfer the distance or the scaling result from the memory to the readout device according to the invention and then effect a convergence of the storage layer to the readout device using a transponder.

BRIEF DESCRIPTION OF THE DRAWINGS

Examples of implementation of the invention are described hereinafter with reference to the drawings, in which:

FIG. 4 is a partial sectional front view of FIG. 3a;

DETAILED DESCRIPTION OF THE INVENTION

Figure 1:
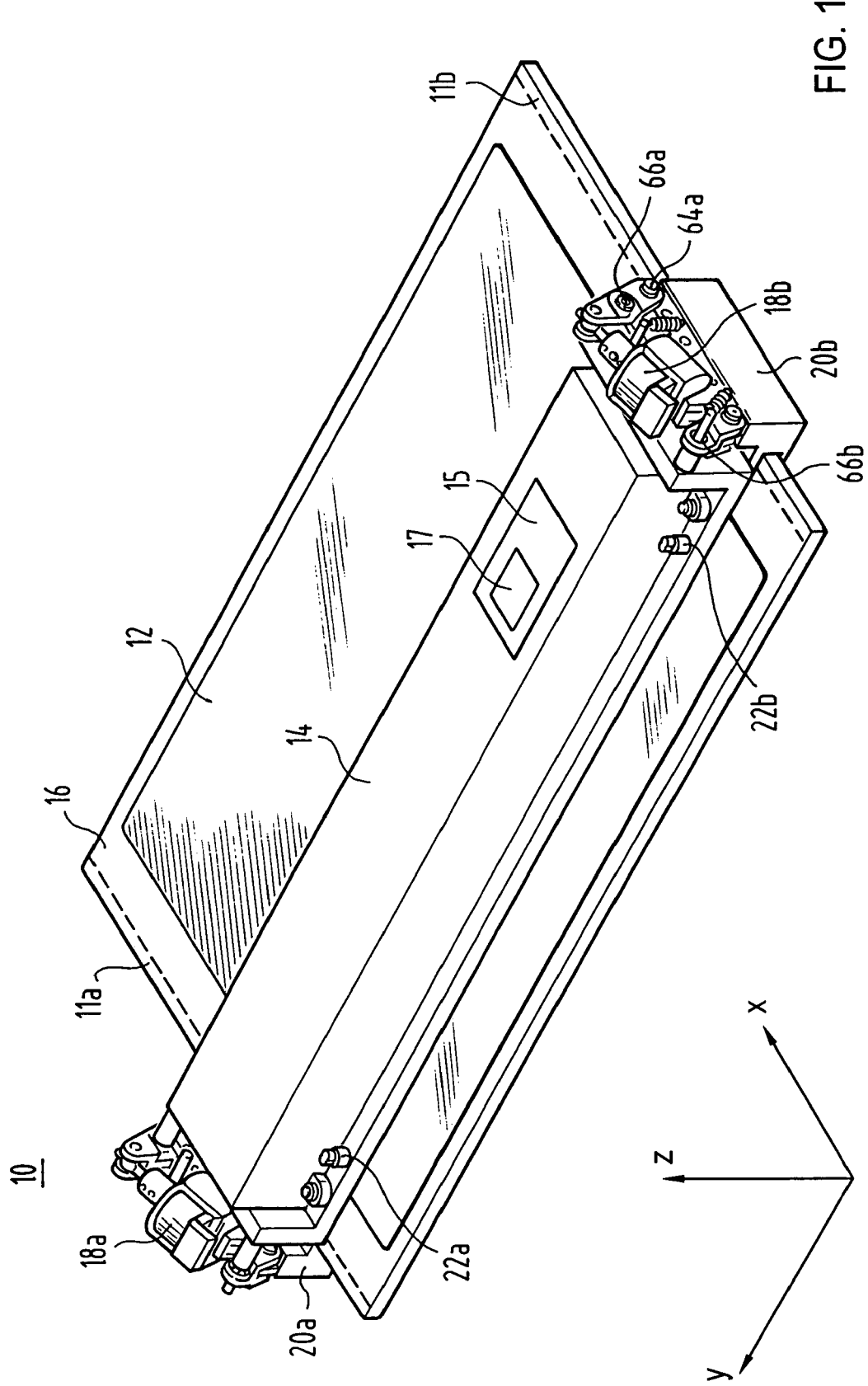
FIG. 1 is a diagrammatic perspective view of a first embodiment of a device according to the invention for reading out information stored in a storage layer.

FIG. 1 shows a digital scanner 10 for X-ray applications as a device according to the invention for reading out information stored in a storage layer 12 that is arranged on a support surface 16. The support surface 16 spans an x-y plane. A z direction runs perpendicular to this x-y plane. The scanner 10 comprises a scanning head 14 in which is arranged a receiving device for receiving emission radiation emitted from the storage layer 12. The receiving device may contain a CCD cell with imaging optics connected upstream. A radiation device for transmitting an excitation radiation is likewise arranged in the scanning head 14, or in a transmitted light scanner underneath the support surface 16. The radiation source may comprise a plurality of laser diodes arranged next to one another, whose radiations are guided via optical systems to the storage layer 12, whereby a line of the storage layer 12 can be excited. The scanning head 14 is connected via a first and a second adjustment unit 18a, 18b to a first and a second bearing device 20a, 20b, with which the scanning head 14 is guided on the support surface 16. The two bearing devices 20a, 20b are in this connection arranged in two edge regions 11a and 11b of the support surface 16. In this way it is ensured that the course of the edge regions 11a, 11b in the z direction coincides exactly with the course of the support surface 16. The respective level in the z direction of the edge regions 11a, 11b coincides with the level in the z direction of the support surface 16. During a readout procedure the scanning head 14, driven by a drive device not shown here, is guided in the x direction over the storage layer 12. The support surface 16 is here preferably made of glass. The glass surface may be made particularly smooth and thereby ensures a particularly exact guidance of the scanning head 14. FIG. 1 furthermore shows a control means 15 that serves to control the readout of the storage layer 12 by means of the scanner 10. The control means 15 is here mounted on the scanning head 14 and contains a memory 17 in which various information required for the readout is stored and which can be accessed by the control means 15 as necessary. The significance of a first and second callipers 22a, 22b is discussed in more detail hereinbelow. In this connection it is of course possible to use only one precision calliper instead of two precision callipers.

Figure 2A:
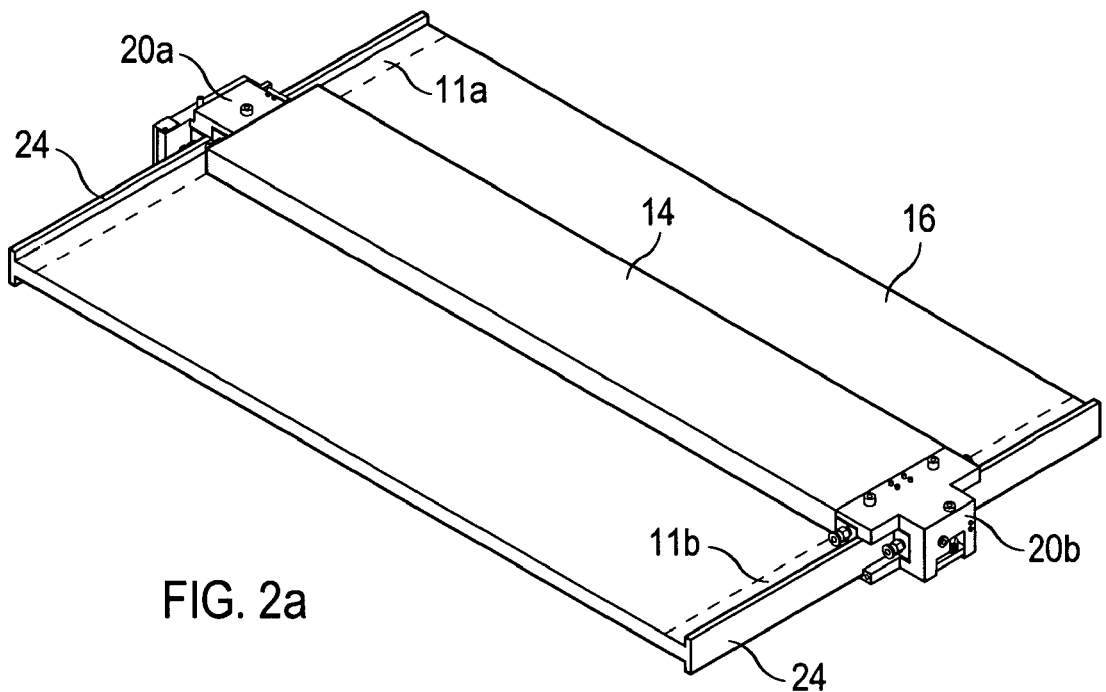
FIG. 2a–2c illustrate a second embodiment of a device according to the invention after successive dismantling of parts of the device according to the invention.
Figure 2B:
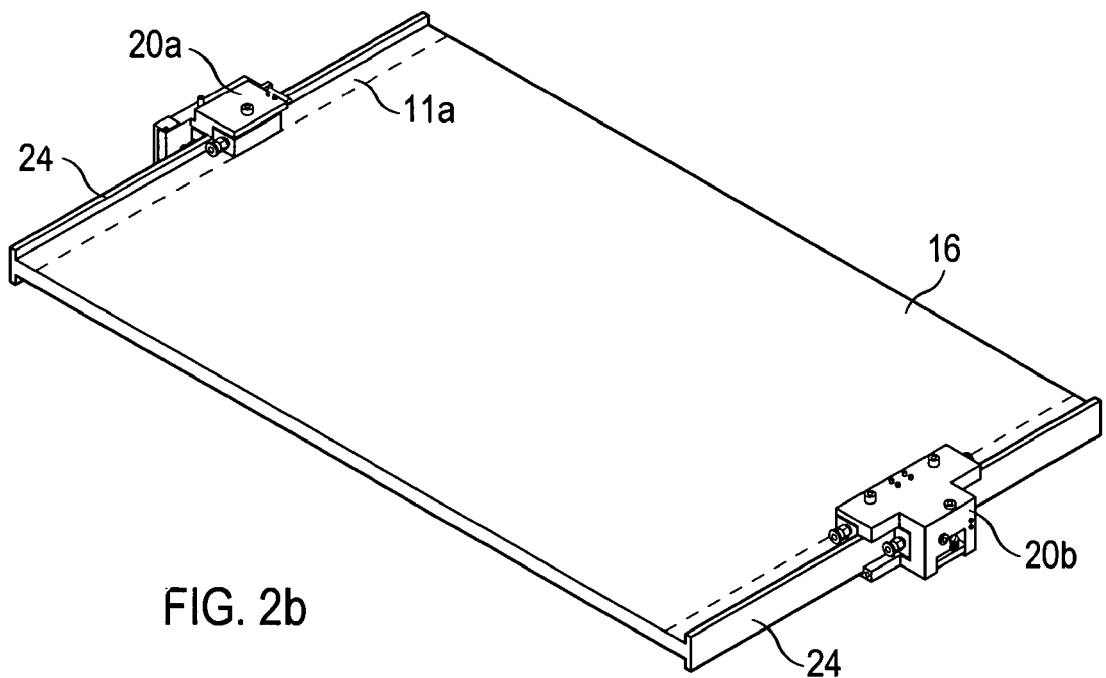
Figure 2C:
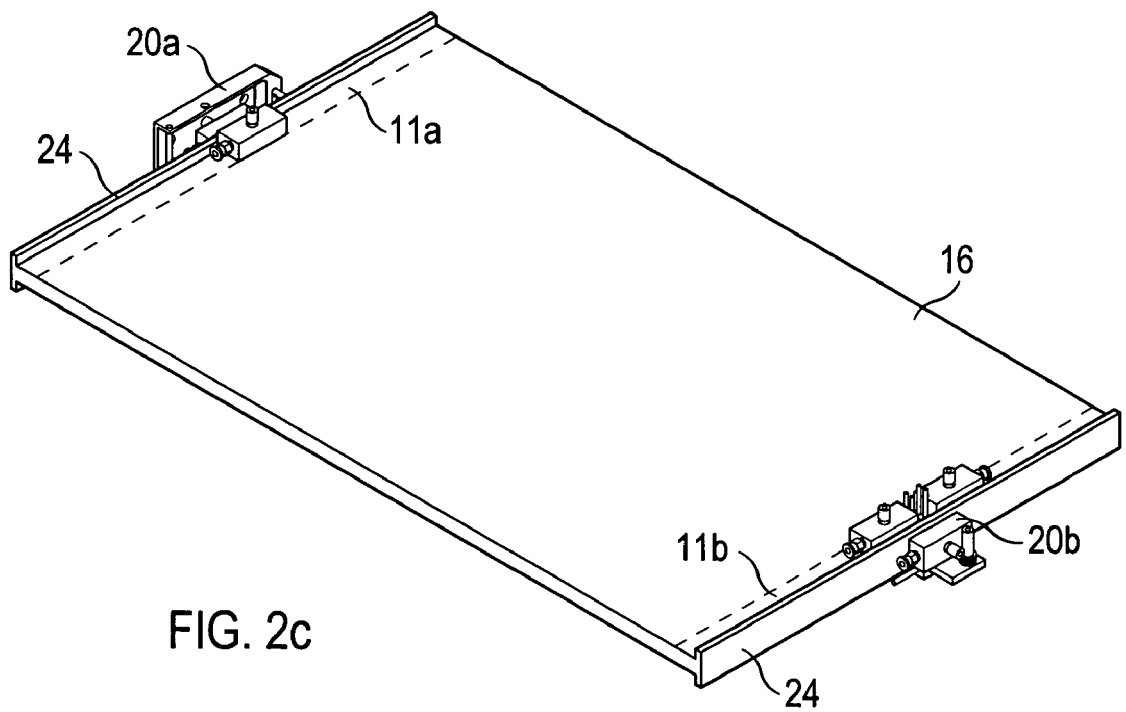

FIGS. 2a to 2c show a construction of the device according to the invention, in which the support surface 16 has pronounced edge rims 24 at the two ends in the y direction to provide a particularly simple bearing and guidance of the scanning head 14 relative to the support surface 16. These edge rims 24 serve to guide the scanning head 14 in the y direction. FIG. 2a shows the scanning head 14 after removal of its cover cap. The adjustment units 18a, 18b have likewise been removed and are thus not shown. FIG. 2b shows the arrangement of FIG. 2a without the scanning head 14, while FIG. 2c shows the arrangement of FIG. 2b in which the housing coverings of the left-hand and right-hand bearing device 20a, 20b have been removed.

Figure 3A:
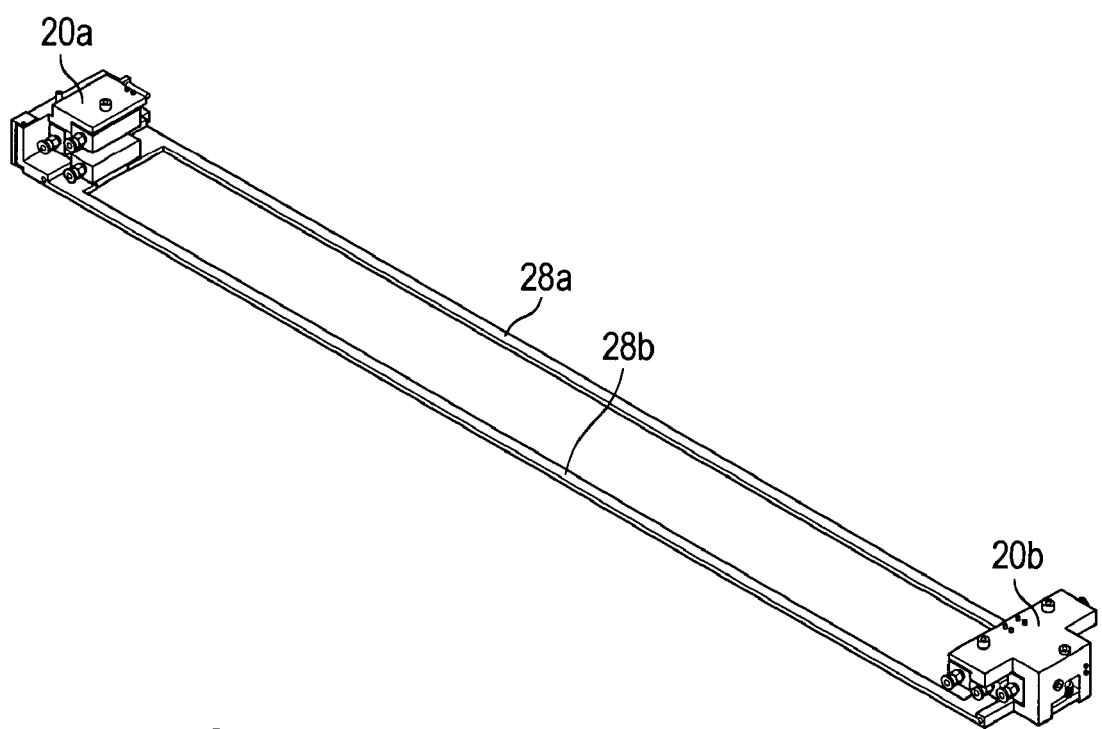
FIG. 3a–3d illustrate the bearing of the receiving device of FIG. 2b.
Figure 3B:
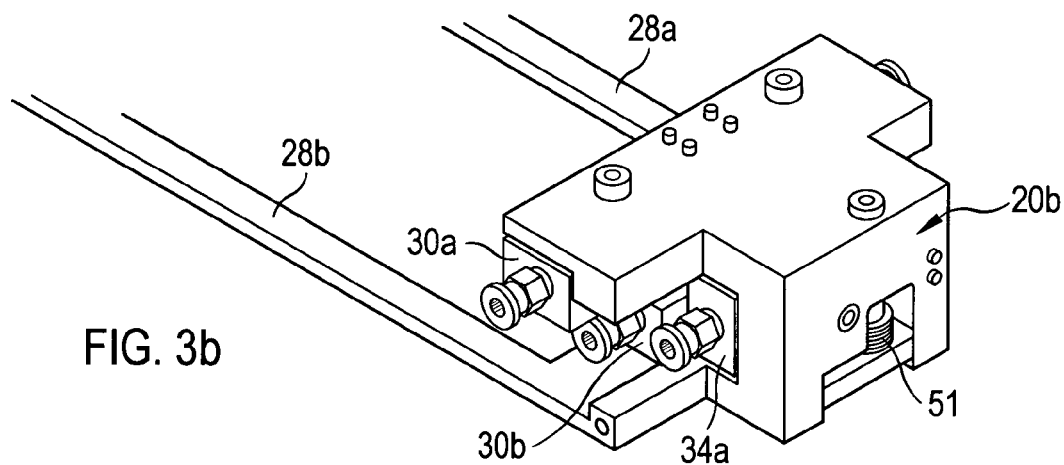
Figure 3C:
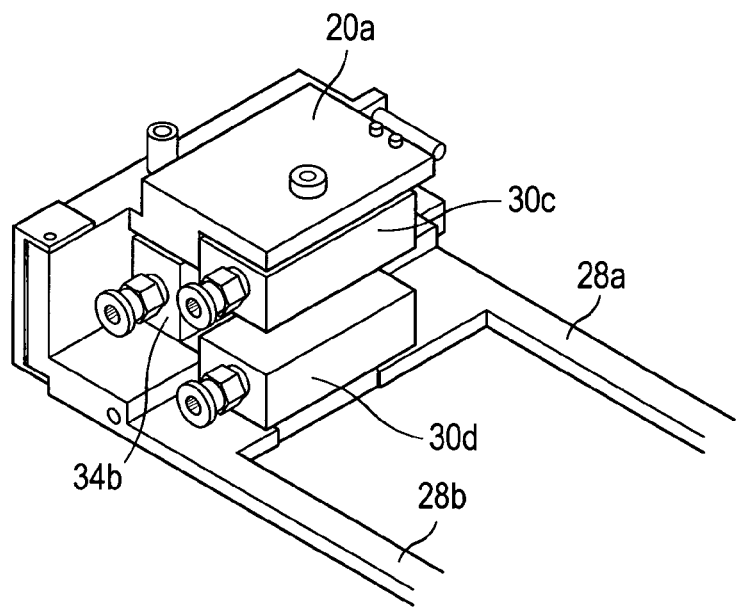
Figure 3D:
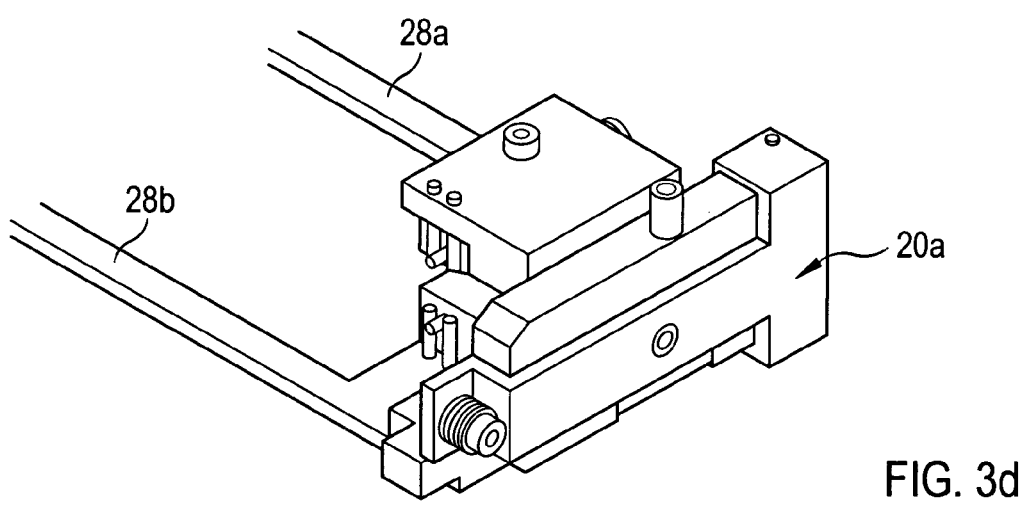

FIG. 3a corresponds to the view of FIG. 2b, in which however the support surface 16 has been removed from the drawing. It can be seen that the left-hand and the right-hand bearing device 20a, 20b are joined to one another via two webs 28a, 28b. FIG. 3b shows the right-hand bearing device 20b and FIG. 3c shows the left-hand bearing device 20a of FIG. 3a in detail. A rear view of the left-hand bearing device 20a is shown in FIG. 3d.

Figure 4:
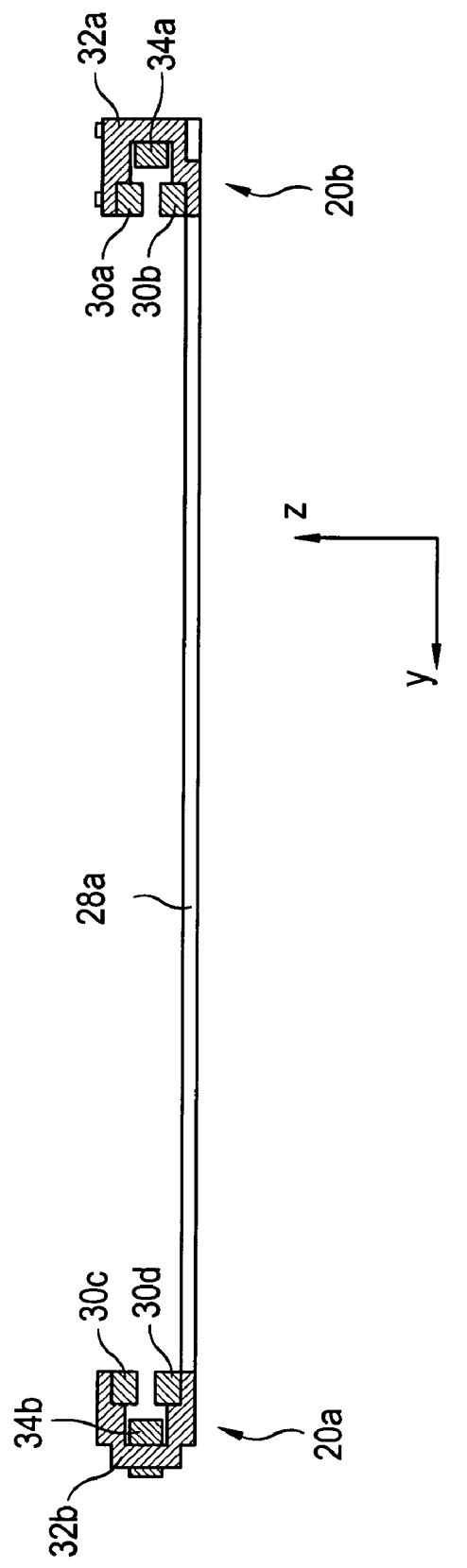

FIG. 4 shows diagrammatically a partial sectional front view of the representation of FIG. 3a, from which it can be seen that the bearing devices 20a and 20b involve two air cushions 30a, 30b and 30c, 30d that co-operate in the z axial direction. Via a connection 32a of the right-hand bearing device 20b and via a connection 32b of the left-hand bearing device 20a their respective air cushions 30a, 30b and 30c, 30d are pretensioned against one another in a spring-like manner in the z axial direction. Forces to effect the pretensioning may be produced for example by means of disc springs that act on the connections 32a and 32b. The air pressure generated in each case during operation by the air cushions produces counterforces to the forces generated by the disc springs. In the y direction two air cushions 34a, 34b co-operate in the sense of a bearing and a counterbearing. The air cushions 34a, 34b in the y direction are likewise pretensioned against one another in a spring-like manner. The support surface 16 on which the various air cushions rest is clamped as if between pincers by the pair of air cushions.

Figure 5A:
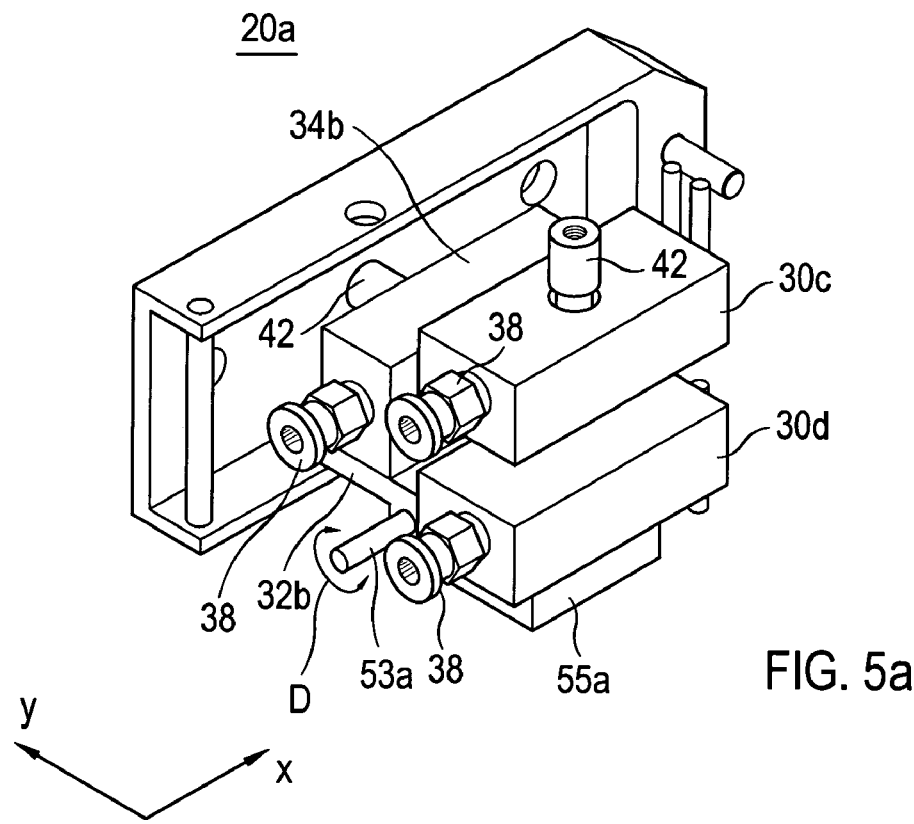
FIG. 5a, b are detailed views of details of FIG. 3b.
Figure 5B:
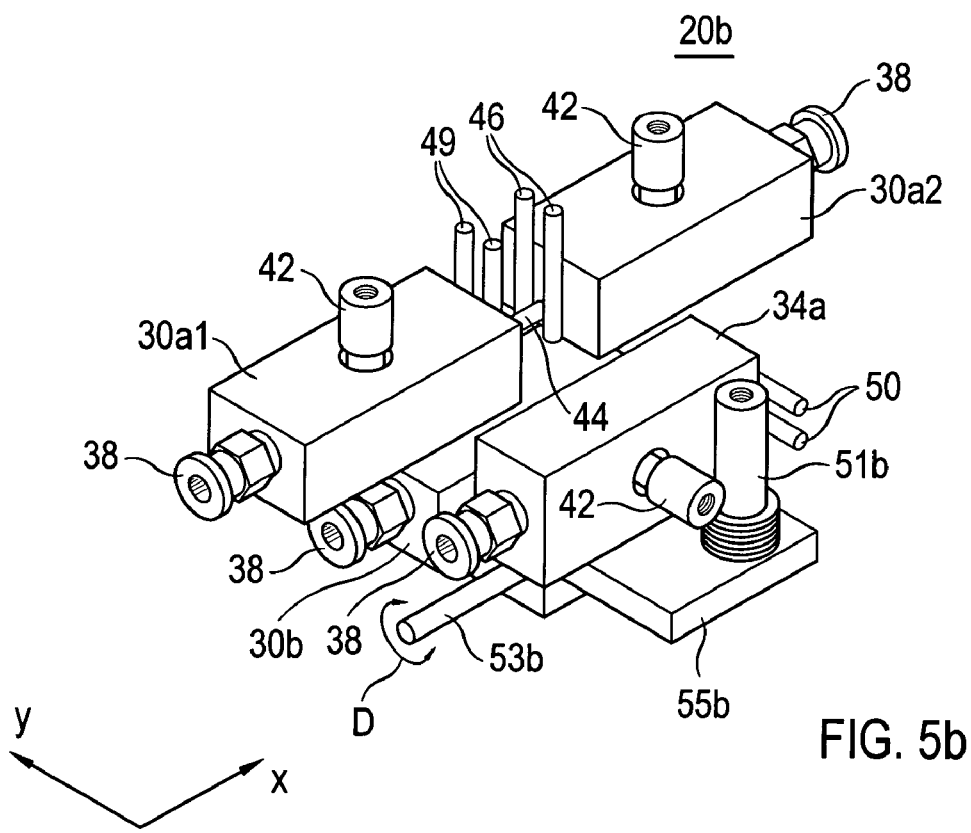
Figure 6A:
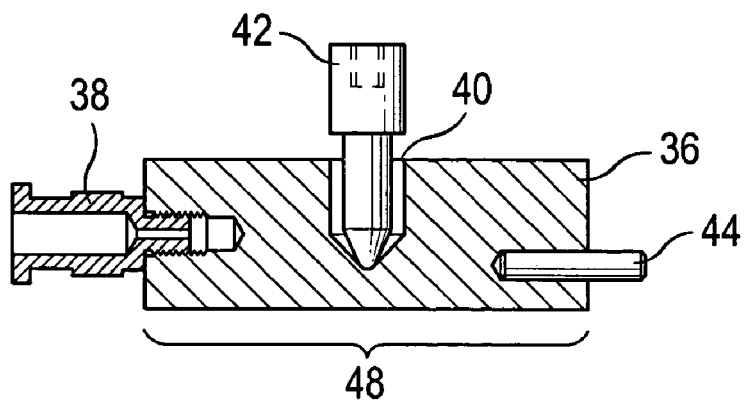
FIG. 6 is a detailed view of a preferably used air cushion.

FIG. 5a shows the air cushions 30c, 30d and 34b of the left-hand bearing device 20a, and FIG. 5b shows the air cushions 30a1, 30a2, 30b and 34a of the right-hand bearing device 20b with a greater degree of accuracy. One of the air cushions that is used is shown in a representational manner in FIGS. 6a to c, without specifying its installation site in one of the bearing devices 20a, 20b, generally identified by the reference numeral 36. The air cushion 36 comprises an air connection 38 as well as a bearing 40, in which for example a conical screw 42 is arranged to produce a point-like bearing, which screw is to be rigidly connected to the associated housing covering of the respective bearing device 20a, 20b and thus with the scanning head 14 to be supported. For this purpose the head of the conical screw 42 is provided with a thread. A self-adjusting bearing is achieved by the point-like bearing via the tip of the conical screw 42.

Figure 6B:
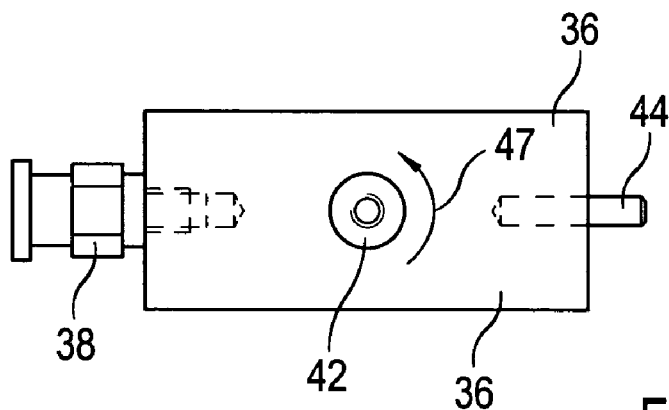
Figure 6C:
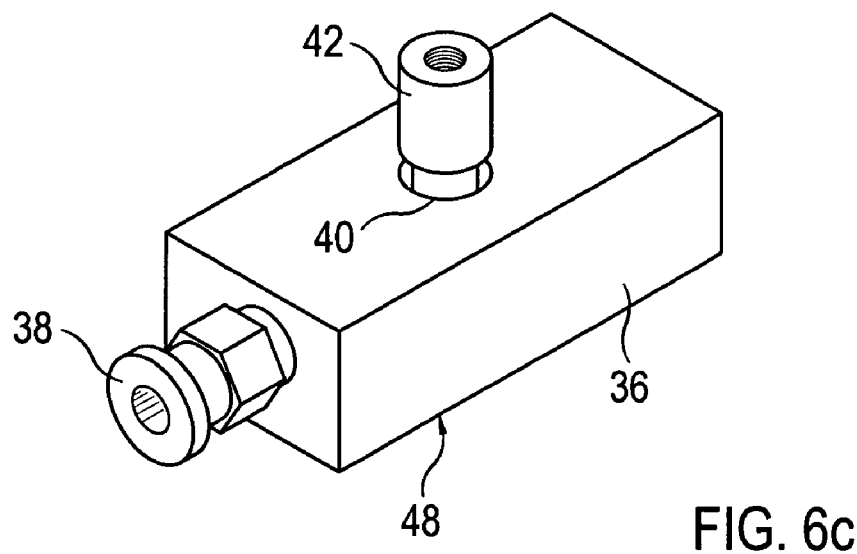

FIG. 6b shows a plan view of the air cushion 36. An anti-torsion device 44 is arranged in the air cushion 36 in order to prevent the air cushion 36 rotating in the direction identified by the arrow 47 in FIG. 6b. The air outlet side of the air cushion 36 is identified by the reference numeral 48. This contains air outflow openings through which the air introduced into the bearing via the air connection 38 is blown out.

Returning now to the representation shown in FIG. 5b, it can be seen that the upper air cushion 30a (see FIG. 4) in this case includes two air cushions 30a1, 30a2 that are arranged adjacent to one another in the x direction. In this way it is ensured that the scanning head 14 does not tilt about the y axis during the activation of the air cushions. Here, anti-torsion devices 46 for the air cushion 30a2, anti-torsion devices 49 for the air cushion 30a1 and anti-torsion devices 50 for the air cushion 34a correspond to the anti-torsion device 44 generally described above. The anti-torsion devices 46, 49, 50 are secured at their respective ends shown in FIG. 5b to the housing covering (not shown) of the bearing device 20b. The conical screws 42 of FIGS. 5a, 5b are connected to one another via the connections 32a, 32b, to the bearing and counterbearing, and are also connected to the scanning head 14.

FIG. 5b shows in addition a disc spring 51b that serves to generate a force for producing a pretensioning of the pair of air cushions 30a1, 30a2 and 30b in the z direction. The disc spring 51b is provided on its upper side with a thread via which the disc spring 51b can be secured to the housing covering of the bearing device 20b (see also the diagram in FIG. 3b). The force generated by the disc spring 51b is transmitted here via a connecting plate 55b to the air cushion 30b that is joined to the connecting plate 55b. The connecting plate 55b is in this connection connected to a rotating shaft 53b running in the x direction, the shaft permitting a tilting of the connecting plate 55b and thus of the air cushion 30b along a rotation direction D. The rotating shaft 53b is secured at both ends to the housing (not shown) of the bearing device 20b. The air pressures generated by the air cushions 30a1, 30a2 and 30b in operation form a counterforce to the force generated by the disc spring 51b. In this way a pincer-like bearing of the support surface 16 that is located between the bearings 30a1, 30a2 and 30b is produced. A further disc spring (not shown) corresponding to the disc spring 51b, a connecting plate 55a as well as a rotating shaft 53a are provided for the bearing device 20a in order also to ensure the pincer-like bearing of the support surface 16.

Figure 7A:
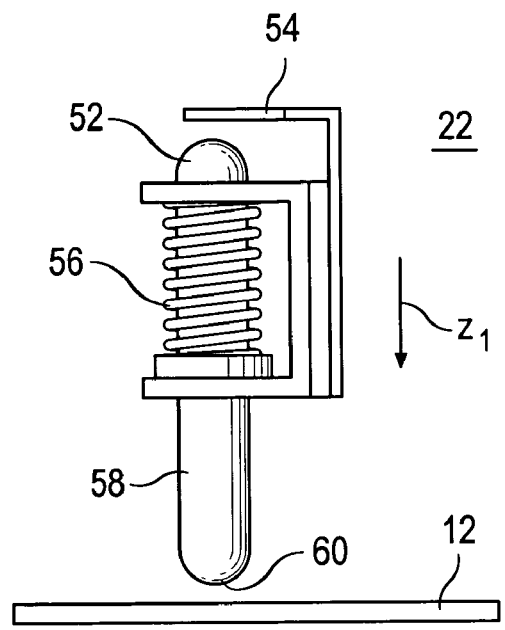
FIG. 7a, b illustrate a side view and perspective view of a precision calliper preferably used in the device according to the invention.
Figure 7B:
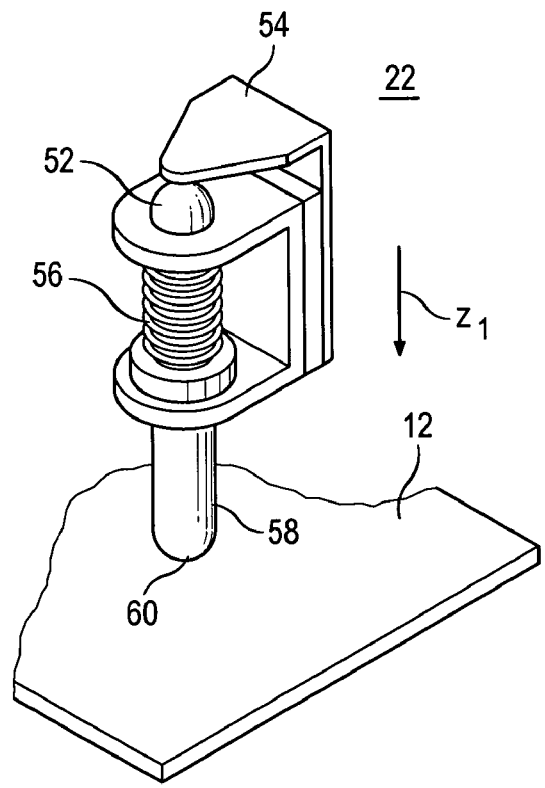

FIGS. 7a and 7b show an embodiment of the precision calliper 22 already illustrated in FIG. 1. The precision calliper 22 is connected to the scanning head 14, in which connection it may advantageously be provided that the precision calliper is displacedly arranged in the y direction. In order to scale the distance between the storage layer 12 and the receiving device contained in the scanning head 14, the scanning head 14, which is connected to the precision calliper 22, is lowered in the $z_1$ direction, i.e. in the direction of the storage layer 12, until an upper side 52 of a contact pin 58 comes into contact with a contact spring 54. In this case a lower side 60 of the contact pin 58 is in contact with the storage layer 12. A spring 56 ensures that, without corresponding pressure on the lower side 60 of the contact pin 58, i.e. without resistance due to the storage layer 12, the upper side 52 of the contact pin 58 and the contact spring 54 are not in contact. After a scaling carried out in the aforedescribed manner, an optimal distance between the storage layer 12 and receiving device of the scanning head 14 is adjusted by means of the adjustment unit 18 shown in FIG. 8, by retracting the scanning head 14 by the optimal distance in the opposite $z_1$ direction, after the head has come into contact with the contact spring 54 through the upper side 52 of the contact pin 58. In this way an interspacing is formed between the lower side 60 of the contact pin 58 and the storage layer 12. The adjustment of the optimal distance is controlled for the sake of simplicity by the control means 15 (FIG. 1). The optimal distance may have been determined by a previously executed calibration of the scanner. The adjustment of the optimal distance ensures in particular that the image sharpness during the readout of the storage layer 12 is extremely good and is uniform as far as possible over the whole area of the storage layer 12.

Figure 8:
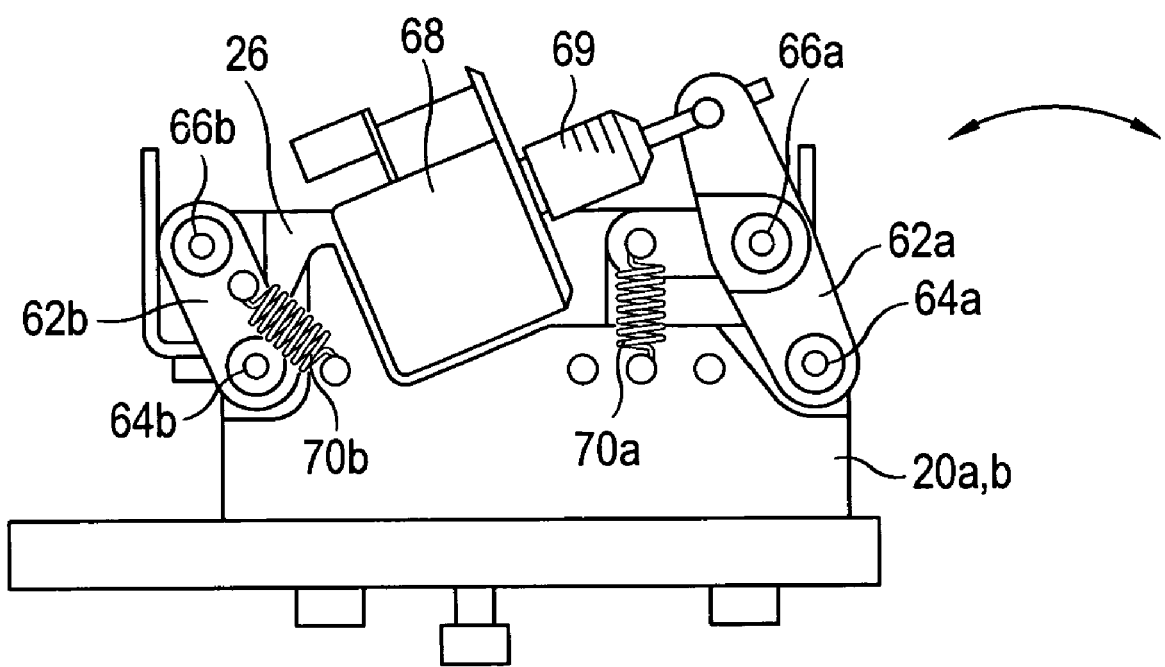
FIG. 8 is a detailed view of an adjustment unit that can be preferably used.

With reference to FIG. 8, the adjustment unit 18 comprises two rods 62a, 62b guided in parallel, which on the one hand are coupled via bearings 64a, 64b to one of the bearing devices 20a, 20b, and on the other hand are coupled via bearings 66a, 66b to the scanning head 14. The rod 62a can be deflected by a stepping motor 68 with integrated spindle 69, this movement being transmitted as a corresponding deflection to the rod 62b. In this way the distance between the storage layer 12 and receiving device, i.e. scanning head 14, can be very precisely adjusted. Springs 70a, 70b provide for a clamping of the adjustment unit 18 that is as far as possible free from play.

Such a distance adjustment may be carried out for different storage layers in each case before beginning a readout procedure, the distance advantageously being maintained constant during the readout procedure. This improves the readout quality since different storage layers, due to production conditions, have in particular different thicknesses, which means that with different storage layers 12 there would be different distances between the surface of the respective storage layer 12 and the receiving device contained in the scanning head 14. The distance may advantageously be finely adjusted during a readout procedure. For the sake of simplicity this is performed by means of the control means 15. It is advantageous, particularly for the implementation of the last-mentioned variant, if the distance is constantly measured during a scanning procedure. A mechanical scanning by means of a measuring wheel for example is suitable for this purpose; the wheel runs with a minimal bearing force on the surface of the storage layer 12 during the scanning process and transmits the level of the storage layer to a measuring system. Alternatively, a contactless distance measuring device may also be used, in which connection however care should be taken to ensure that the storage layer is not thereby excited to emit radiation.

It may be envisaged that, for repeated readout procedures of the same storage layer 12, the result of the previously executed scaling or distance measurement be recorded in a memory 17 (see FIG. 1) and allocated to the storage layer. This can be realised in a particularly advantageous manner if the storage layer 12 is mounted in a cassette and this cassette has access to such a memory. In order to read out the storage layer 12 contained in the cassette, the latter is inserted into the scanner according to the invention and the storage layer 12 is then removed from the cassette and inserted into the scanner. The result of the previously executed distance measurement or scaling stored in the memory can for the sake of simplicity be transmitted by a transponder to the device according to the invention for the readout of the information from the storage layer. It is however also possible to store the result of the previously executed distance measurement or scaling in the memory 17 of the scanner after the execution of the procedure. After re-identifying the associated storage layer, the stored distance from the scanning head 14 to the support surface 16 can be accessed and adjusted.

Figure 9:
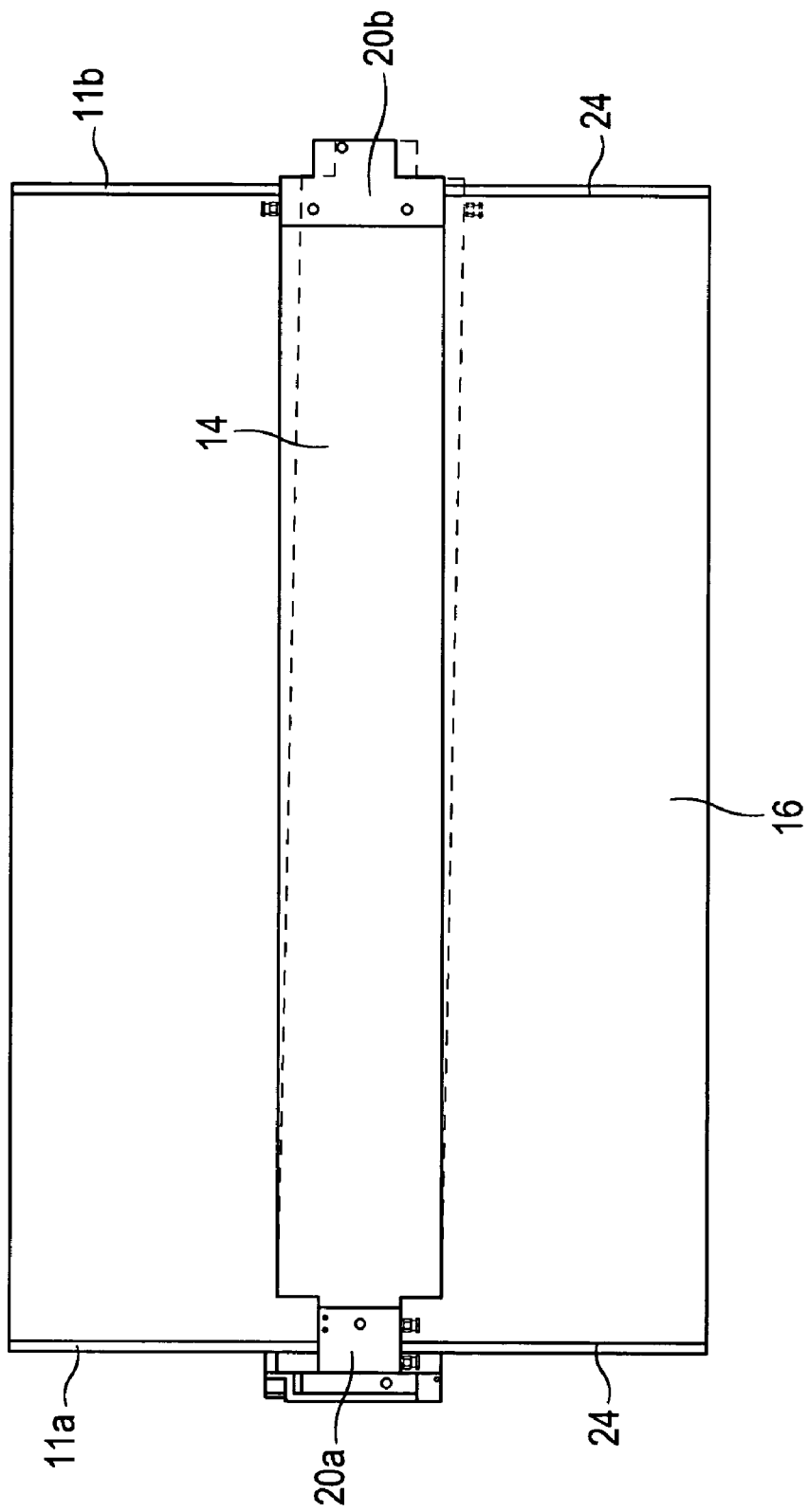
FIG. 9 is a diagrammatic view of the oscillatory movements of the receiving device made possible by the use of air cushions, illustrated for example by oscillations about the z axis.

FIG. 9 shows that an oscillation of the scanning head 14 about the z axis is made possible by the use of air cushions, without resulting in a slip-stick effect. In this way the device according to the invention is particularly suitable also for a bilateral drive of the receiving device.

In the case where it is signalled, via a transponder associated with the storage layer, that no scaling or distance measurement has yet been carried out for the corresponding storage layer, it may be envisaged that this be initiated automatically by the readout device according to the invention.

The foregoing description of the present invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of this invention.

What is claimed is:

1. Device for reading out information stored in a storage layer, comprising:
a support surface for supporting the storage layer;
a receiving device for receiving an emission radiation transmitted from the storage layer;
a drive device for producing a relative movement between the receiving device and the storage layer;
guide means for guiding the receiving device or the storage layer on the support surface, acting as a guide surface, during execution of the relative movement; and
an adjustment unit for the variable adjustment of a distance between the receiving device and the support surface, said adjustment unit comprising: a spindle having two connecting elements that are guided in parallel, and connected to the guide means so the receiving device can rotate about a connection point with the guide means.

* * * * *